Nov. 8, 1966  A. MOTSCH  3,283,864
DISK-CLUTCH PARTICULARLY FOR MOTOR VEHICLES
Filed Aug. 14, 1964  2 Sheets-Sheet 1

ALFONS MOTSCH
INVENTOR

BY John R. Faulkner
Clifford L. Sadler
ATTORNEYS

ALFONS MOTSCH
INVENTOR

BY John R. Faulkner
Clifford L. Sadler
ATTORNEYS

United States Patent Office 3,283,864
Patented Nov. 8, 1966

3,283,864
DISK-CLUTCH PARTICULARLY FOR
MOTOR VEHICLES
Alfons Motsch, Cologne-Nippes, Germany, assignor to
Ford Motor Company, Dearborn, Mich., a corporation
of Delaware
Filed Aug. 14, 1964, Ser. No. 389,543
Claims priority, application Germany, Aug. 16, 1963,
F 40,509
7 Claims. (Cl. 192—68)

The present invention relates generally to vehicle clutches and more particularly to vehicle clutches of the type having a Belleville type disk spring that urges the pressure plate into engagement with the clutch disk.

One object of the invention is to provide a sure and steady centering device for the clutch pressure plate and a Belleville type disk spring which avoids centrifugal unbalance, whereby silent operation is effected. Simultaneously, the so-called dead clutch travel at the inner ends of the tongues of the disk spring is substantially reduced by supporting the disk spring at its pivot or fulcrum free from clearance. The device used for centering and supporting the disk spring at its pivot support enables a space saving arrangement as well as easy and cheap manufacturing.

With reference to the centering of the disk-spring, it is old to connect the disk-spring at its outer periphery with the clutch cover by means of bolts. This connection can not be rigid and free from clearance because of the necessary movement of the disk-spring, therefore, proper centering is not guaranteed. Furthermore, it is known to connect the disk-spring at its outer periphery to a clutch cover and to the clutch pressure plate by resilient connection means. This connection means is rigidly fastened to the clutch cover as well as to the disk-spring. Therefore, the resilient connection means must transmit the forces acting against centrifugal unbalance as well as the total axial force between the clutch pressure plate and the disk-spring. This combined stress makes it necessary to use comparatively expensive resilient material.

The present invention avoids the disadvantages of the prior art in a surprisingly simple and cheap way. According to this invention, it is proposed to connect the clutch pressure plate to the clutch cover by means of a centrically corrugated disk. This corrugated disk has high radial stiffness and may be solid or perforated. The clutch thrust spring is of the disk-spring or Belleville type and is centered by tongues stamped out of the clutch cover.

A further advantage is obtained by supporting the disk-spring, which is provided with radial slots, on a pivot support formed by parts of the clutch cover and by fastening it by means of the tongues stamped out of the clutch cover for centering the disk-spring. These centering tongues project through openings in a U-shaped or angular-shaped clamping ring. In the preferred embodiment, the cover tongues are riveted or upset in the axial direction within the clamping ring.

In further embodiments of the invention, the clamping ring is fastened to the centering tongues by riveting in a radial direction, by welding or by beading over the tongues in the radial direction, to provide a pivot support for the disk-spring that is free of clearance.

Furthermore, there are rests or supports to avoid a total tension release of the disk-spring which would cause increased tensions loading of the pivot support structure. These rests are formed by tongues stamped out of the clutch cover, or according to a second embodiment, these rests are formed by inwardly directed tongues of a clamping ring.

A further advantageous feature of the invention is, that the clutch pressure plate is provided with bosses directed to the driven side of the clutch and passing through openings in the clutch cover. This represents a security against breakage of the centrically corrugated disk. Simultaneously, the arrangement is friction free and, therefore, silent in operation.

The objects and advantages of the present invention will be more thoroughly understood when considered in connection with the following detailed description and the accompanying drawings, in which:

FIGURE 2b shows a sectional view taken along section line 2B—2B of FIGURE 2a;

FIGURE 3 shows a sectional view of a clutch disclosing a further fastening means for the clamping ring; and FIGURE 4 shows a sectional view of a clutch disclosing a still further fastening means for the clamping ring.

Referring now to the drawings, wherein the presently preferred embodiments are disclosed, like reference numerals identify like parts throughout the various views.

Figure 1A:
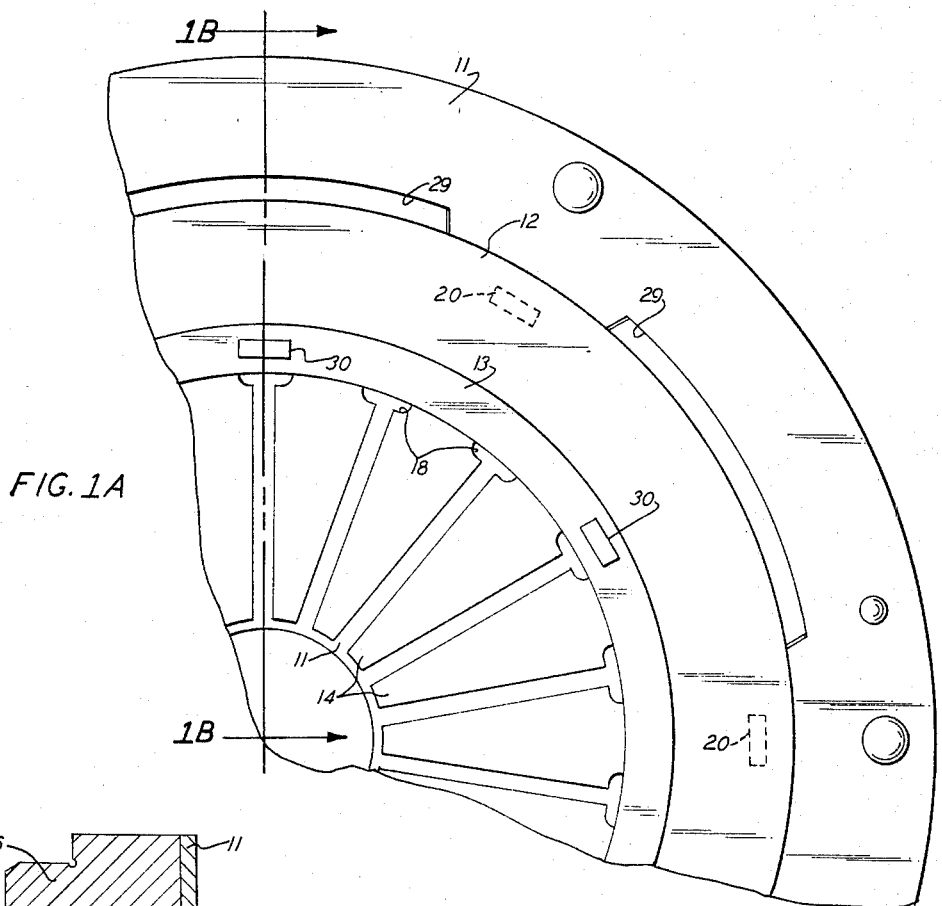
FIGURE 1a shows an elevation view of a part of a clutch constructed according to the present invention.
Figure 1B:
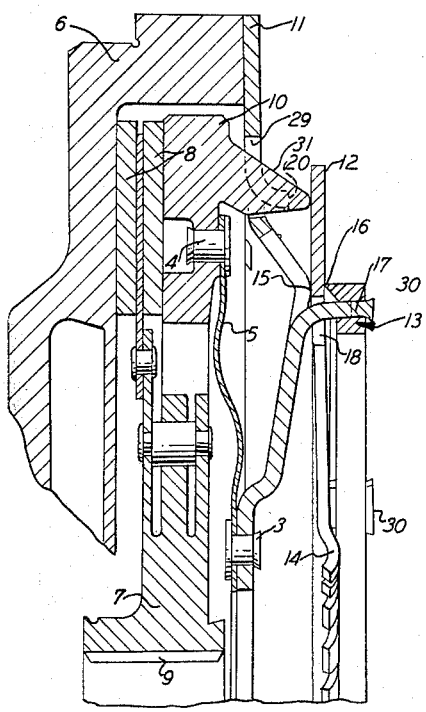
FIGURE 1b shows a sectional view of the clutch of FIGURE 1a taken along section line 1B—1B.

FIGURES 1a and 1b show a flywheel 6 and a clutch disk 7 carrying friction material 8 and supported between the flywheel 6 and a clutch pressure plate 10. Hub 9 of the clutch disk 7 is splined to the front end of the transmission gear shaft (not shown). The clutch cover 11 may be fastened to the flywheel 6 by bolts in a conventional fashion. The bolts may project through bores provided in the outer periphery of the clutch cover 11.

The clutch pressure plate 10 is connected to the clutch cover 11 by a centrically corrugated disk 5 of high radial stiffness by means of rivets 3 and 4. Although the disk 5 is radially stiff, it is flexible in an axial direction.

A disk-spring 12 rests on a pivot support 15 stamped out of the clutch cover 11. Tongues 17 also stamped out of the clutch cover 11, project through openings 18 of the disk spring 12 and through bores in a U-shaped or angular-shaped clamping ring 13. The ends of the tongues 17 are riveted or upset at 30 to secure the clamping ring 13. The clamping ring 13 is provided with a knife-edge or an only slightly rounded border 16 which, in connection with the support 15 of the clutch cover 11, provides a free from clearance pivot for the disk-spring 12.

The border 16 being formed as a knife-edge (or as a slightly rounded border) keeps movement of the loadpoint as small as possible.

Total release of the disk spring is avoided by tongues 20 stamped out of the clutch cover 11 to avoid increased tension between the supporting points 15 and 16. In the released position of the clutch, the disk spring 12 rests on these tongues.

The above-described embodiment of the invention provides the advantage that the so-called dead clutch travel at the disk-spring tongues 14 is substantially reduced. To avoid this dead clutch travel, it is necessary to support the disk-spring 12 between the supporting points 15 and 16 as free from clearance as possible. This is performed by fastening means for the clamping ring 13 providing tension in the axial direction. In the present case, this tension is advantageously achieve by riveting or upset the ends 30 of tongues 17.

Figure 2A:
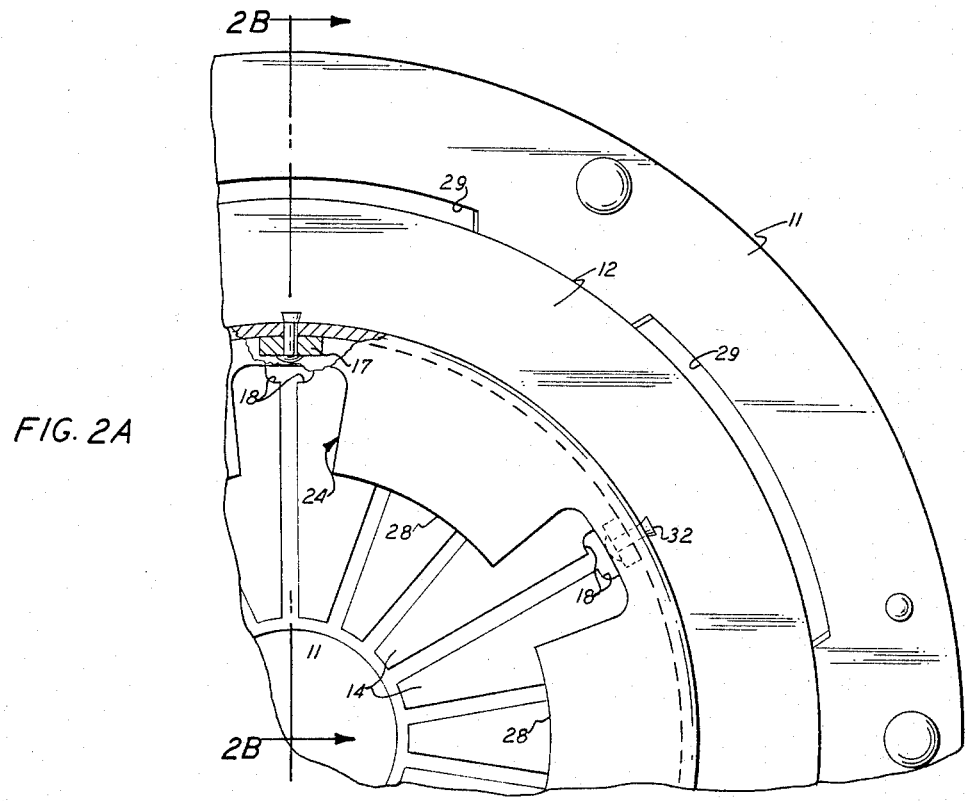
FIGURE 2a shows an elevation view of a further embodiment of a clutch according to this invention.
Figures 2B, 3, 4:
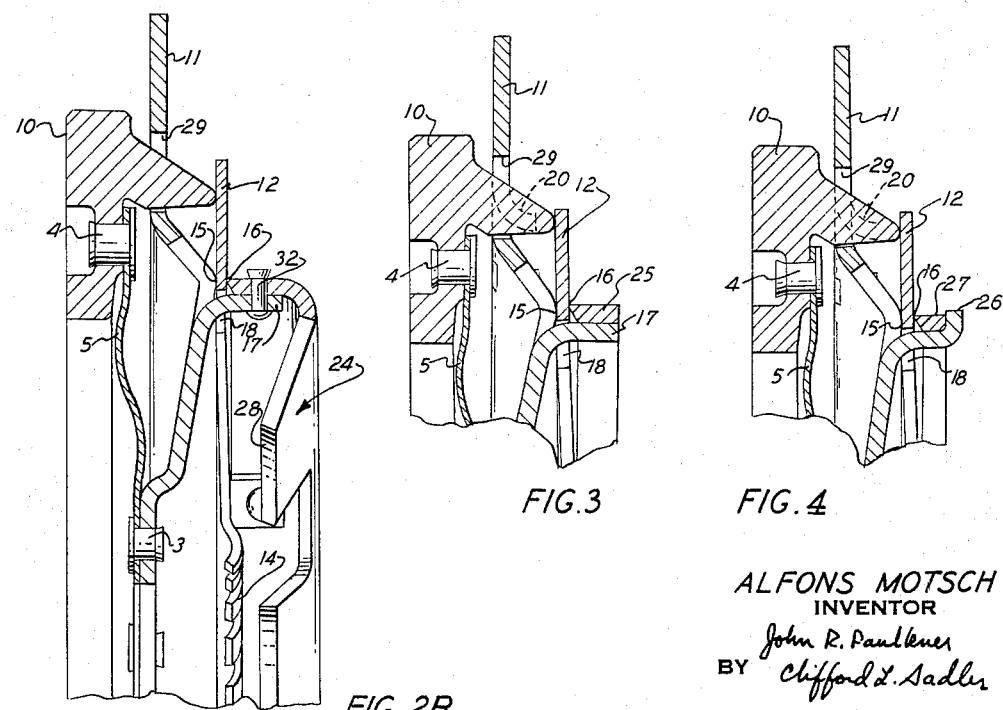

FIGURES 2a and 2b show a clutch similar to that of FIGURES 1a and 1b. In this embodiment, a clamping ring 24 is riveted at 29 in the radical direction to the centering tongues 17 for the disk-spring 13. The clamping ring 24 is used on one side 16 as a pivot for the disk-spring 12 and on the other side 28 it provides a rest or stop for the inwardly directed tongues 14 of the disk-spring 12 when the clutch is in its released position. The openings 18 enable the assembling and the riveting. All other construction features are the same as those of the above-mentioned clamping ring 13.

FIGURE 3 shows a clutch cover 11 with tongues 17 stamped out of the cover which project through openings 18 in a disk spring 12. This is similar in construction to the arrangement previously described. In this case, a clamping ring 25 is welded to the tongues 17. The ring 25 also has a knife edge 16 that functions as a pivot or fulcrum for the Belleville spring disk 12.

FIGURE 4 also shows a clutch cover 11 with tongues 17 stamped out of the cover which project through openings 18 of a disk-spring 12. In this embodiment, a clamping ring 27 is positioned against the disk spring 12 by means of a radial flanging 26. The ring 27 may also be welded in position, if desired.

In all flanges, the clutch pressure plate 10 is provided with bosses 20 directed to the driven side of the clutch which pass through openings 29 in the clutch cover 12. These bosses 20 comprise a retainer or safety device in the unlikely event breakage of the centrical corrugated disk 5 connecting the clutch pressure plate 10 to the clutch cover 11 should occur.

The operation of a disk-spring clutch of the general type disclosed in the drawings is known and, therefore, has not been described.

The invention is not limited to the embodiments described and shown in the accompanied drawings; there are various other modifications possible without leaving the scope of the invention.

I claim:

1. A clutch assembly having a pressure plate, a cover plate and means connecting said plates constructed for axial movement of said pressure plate with respect to said cover plate while maintaining said plates in coaxial relationship, said means comprising a one-piece annular member having its inner and outer edges connected to said cover and pressure plates and having a series of radially spaced apart circumferential corrugations.

2. A clutch assembly having a pressure plate, a cover plate and means connecting said plates constructed for axial movement of said pressure plate with respect to said cover plate while maintaining said plates in coaxial relationship, said means comprising a one-piece annular member having its inner edge secured to said cover plate and its outer edge secured to said pressure plate, said disk having a series of radially spaced apart circumferential corrugations.

3. A clutch assembly having a pressure plate, a cover plate and means connecting said plates constructed for axial movement of said pressure plate with respect to said cover plate while maintaining said plates in coaxial relationship, said means comprising a one-piece annular member having its inner and outer edges connected to said cover and pressure plates respectively, said annular member having a series of radially spaced apart circumferential corrugations, a disk type spring having a circumferential band with a series of circumferentially spaced apart tongues extending inwardly therefrom, said cover plate being contoured to provide a fulcrum edge for one side of said spring, said spring pressing against said pressure plate, said cover plate having a series of tongues extending through said spring, a clamping ring secured to said tongues and providing a fulcrum edge for the other side of said spring in axial alignment with the fulcrum edge of said cover plate, the distance between the two fulcrum edges being substantially equal to the thickness of said cover plate.

4. A clutch assembly having a pressure plate, a cover plate and means connecting said plates constructed for axial movement of said pressure plate with respect to said cover plate while maintaining said plates in coaxial relationship, a disk type spring having a circumferential band with a series of circumferentially spaced apart tongues extending inwardly therefrom, said cover plate being contoured to provide a fulcrum edge for said spring near the inner edge of said band, said spring pressing against said pressure plate near its outer edge, said cover plate having a series of tongues extending through said spring in an axial direction, a clamping ring secured to said cover plate tongues and providing a fulcrum edge in axial alignment with the fulcrum edge of said cover plate, the distance between the two fulcrum edges being substantially equal to the thickness of said disk spring, said clamping ring being provided with a circumferential series of holes, said cover plate tongues extending through said holes, the ends of said cover plate tongues being enlarged to secure said clamping ring in position against said disk spring.

5. A clutch assembly having a pressure plate, a cover plate and means connecting said plates constructed for axial movement of said pressure plate with respect to said cover plate while maintaining said plates in coaxial relationship, a disk type spring having a circumferential band with a series of circumferentially spaced apart tongues extending inwardly therefrom, said cover plate being contoured to provide a fulcrum edge for said spring near the inner edge of said band, said spring pressing against said pressure plate near its outer edge, said cover plate having a series of tongues extending through said spring in an axial direction, a clamping ring secured to said cover plate tongues and providing a fulcrum edge in axial alignment with the fulcrum edge of said cover plate, the distance between the two fulcrum edges being substantially equal to the thickness of said disk spring, said cover plate tongues having radially extending end portions, said clamping ring being trapped between said end portions and said spring disk.

6. A clutch assembly having a pressure plate, a cover plate and means connecting said plates constructed for axial movement of said pressure plate with respect to said cover plate while maintaining said plates in coaxial relationship, a disk type spring having a circumferential band with a series of circumferentially spaced apart tongues extending inwardly therefrom, said cover plate being contoured to provide a fulcrum edge for one side of said spring, said spring pressing against said pressure plate, said cover plate having a series of tongues extending through said spring, a clamping ring secured to said tongues and providing a fulcrum edge for the other side of said spring in axial alignment with the fulcrum edge of said cover plate, said clamping ring being provided with a circumferential series of holes, said cover plate tongues extending through said holes, the ends of said cover plate tongues being enlarged to secure said clamping ring in position against said disk spring.

7. A clutch assembly having a pressure plate, a cover plate and means connecting said plates constructed for axial movement of said pressure plate with respect to said cover plate while maintaining said plates in coaxial relationship, a disk type spring having a circumferential band with a series of circumferentially spaced apart tongues extending inwardly therefrom, said cover plate being contoured to provide a fulcrum edge for one side of said spring, said spring pressing against said pressure plate, said cover plate having a series of tongues extending through said spring, a clamping ring secured to said tongues and providing a fulcrum edge for the other side of said spring in axial alignment with the fulcrum edge of said cover plate, said cover plate tongues having radially extending end portions, said clamping ring being trapped between said end portions and said spring disk.

References Cited by the Examiner

UNITED STATES PATENTS 1,944,337  1/1934  Wemp _____ 192—68
2,211,192  8/1940  Wolfram _____ 192—68

DAVID J. WILLIAMOWSKY, *Primary Examiner.*

A. T. McKEON, *Assistant Examiner.*